United States Patent [19]

Krisak et al.

[11] 4,188,039
[45] Feb. 12, 1980

[54] BULKHEAD SHAFT SEAL

[75] Inventors: Edward J. Krisak; Stephen Strozak, both of Indiana, Pa.

[73] Assignee: FMC Corporation, San Jose, Calif.

[21] Appl. No.: 732,833

[22] Filed: Oct. 15, 1976

Related U.S. Application Data

[63] Continuation-in-part of Ser. No. 600,747, Jul. 30, 1975, abandoned.

[51] Int. Cl.² ............................................. F16J 15/34
[52] U.S. Cl. ..................................................... 277/95
[58] Field of Search ................... 277/4, 25, 41, 84, 74, 277/206, 95, 94, 205, 81, 88

[56] References Cited

U.S. PATENT DOCUMENTS

| | | | |
|---|---|---|---|
| 2,950,932 | 8/1960 | Gilbert | 277/74 |
| 3,052,476 | 9/1962 | Workman | 277/206 |
| 3,523,692 | 8/1970 | Otto | 277/25 |

FOREIGN PATENT DOCUMENTS

| | | |
|---|---|---|
| 1123765 | 9/1956 | France . |
| 1141567 | 4/1957 | France . |
| 693349 | 6/1953 | United Kingdom . |

Primary Examiner—Lenard A. Footland
Attorney, Agent, or Firm—J. F. Verhoeven

[57] ABSTRACT

A normally non-contacting rotary seal is disclosed which prevents fluid from leaking from one zone, or compartment, to the next through an opening in the compartment separating wall, or bulkhead, through which a rotating shaft passes. The passage of fluid through the wall opening is prevented regardless of which side of the wall becomes flooded. An annular resilient seal, having spaced apart radial flanges, is secured around the shaft for rotation therewith in an annular chamber at the separating wall. No part of the seal normally contacts the stationary walls of the chamber. In the event one compartment becomes flooded, liquid flows past the seal flange adjacent that compartment into the chamber, forcing the other seal flange into sealing contact with the wall of the chamber to block the flow of the liquid into the adjacent compartment. In another embodiment, a stabilizing ring is mounted between the flanges.

7 Claims, 13 Drawing Figures

FIG_10

BULKHEAD SHAFT SEAL

The patent application is a continuation in part of patent application Ser. No. 600,747 filed July 30, 1975, now abandoned.

BACKGROUND OF THE INVENTION

In effecting a fluid seal between a stationary member (such as a wall or housing) and a rotating member (such as a shaft passing through an opening in the wall or housing), it is common to bridge the rotating and stationary members with a sealing member in contact with both to block the leakage of any substance through the opening in the wall or housing through which the shaft passes. Usually, the sealing member is secured to one of the bridged members (either the rotating member or the stationary member) and makes rubbing contact with the other member. With this arrangement, the seal continuously acts as a barrier to the passage of material (either into or out of the housing or through the wall) through the shaft opening.

It is essential that the sealing member maintain continuous contact with both the stationary member and the rotating member if continuous sealing between the two members is to be effected. Although the contact of the sealing member with the member to which it is secured presents no particular problems, the continuous rubbing contact of the sealing member with the other member produces rapid wear which, eventually, will render the sealing member ineffective to perform its sealing function. With such continuous rubbing contact of the seal member, frequent inspection, and periodic replacement, is necessary to avoid leakage.

Sometimes, of course, it is necessary to provide a continuous contact-type seal because the fluid which it is necessary to block is continuously present. However, there are other applications where the fluid which it is desired to block is present only on infrequent occasions. For example, many ships are divided by bulkheads into water-tight compartments. Rotating shafts of the ship's machinery frequently extend through two or more compartments and, accordingly, must pass through openings in the bulkhead separating two compartments. Ordinarily, there is no fluid in either compartment, and sealing is not necessary under normal conditions. It is necessary, however, to seal the openings around the shaft to prevent leakage of water from one compartment to the next in the unusual event that one compartment becomes flooded.

In order to eliminate the continuous wear caused by the continuous rubbing of a sealing member, it is known to provide a seal between a stationary member and a rotating member in which the sealing member is mounted on one of said members and normally out of contact with the other of said members, and in which the sealing member contacts said other of said members in rubbing engagement only in the infrequent event that fluid attempts to penetrate the seal.

SUMMARY OF THE INVENTION

The present invention relates to apparatus for effecting a fluid seal between a stationary member and a rotating member, and, more particularly, to apparatus which provides a bi-directional seal between these two members wherein the seal is effective only during an infrequent presence of fluid.

Although there are many applications where the bi-directional non-contact fluid seal of the present invention can be used to block leakage resulting from the occasional presence of water or other fluid, we have illustrated the seal apparatus of the present invention to prevent water from leaking from one flooded ship compartment to the next compartment (and alternatively from said next compartment to said one compartment) through a shaft opening in the partition, or bulkhead separating the two compartments. In the preferred form of the invention, a sealing member is secured to the rotatable shaft for rotation with the shaft. A stationary housing, which forms a part of the partition, has two aligned openings through which the rotating shaft extends. The sealing member has two, spaced apart, flexible radial flanges which rotate inside the housing. In their normal, relaxed state, the rotating flexible flanges are spaced from the walls of the housing so that, under normal operating conditions of the ship, there is no rubbing contact of the rotating sealing member with the stationary housing or bulkhead. Consequently, under normal operating conditions, there is no wear of the sealing member, and the necessity of frequent inspections and/or replacement of the seal is virtually eliminated.

When either compartment becomes flooded, the fluid from the flooded compartment attempts to flow out of that compartment to the next compartment through the openings through which the shaft passes. Since the sealing member is secured to the shaft to block the flow of water between the seal member and the shaft, the water will attempt to flow around the sealing member. Consequently, the water flows into the housing past the flange adjacent the flooded compartment, and pressure is exerted on the other flange by this flow which presses the other flange into sealing engagement with the wall of the housing adjacent said other flange.

It will therefore be seen that it is the presence of the liquid to be blocked which converts the seal of the present invention from a non-rubbing (and non-wearing) condition to a rubbing (and sealing) condition.

It is an object of the present invention to provide a seal between a stationary member and a rotating member which is effective only in the presence of fluid to be blocked and which then prevents the flow of fluid in either direction.

DESCRIPTION OF THE PREFERRED EMBODIMENT

Figure 1:
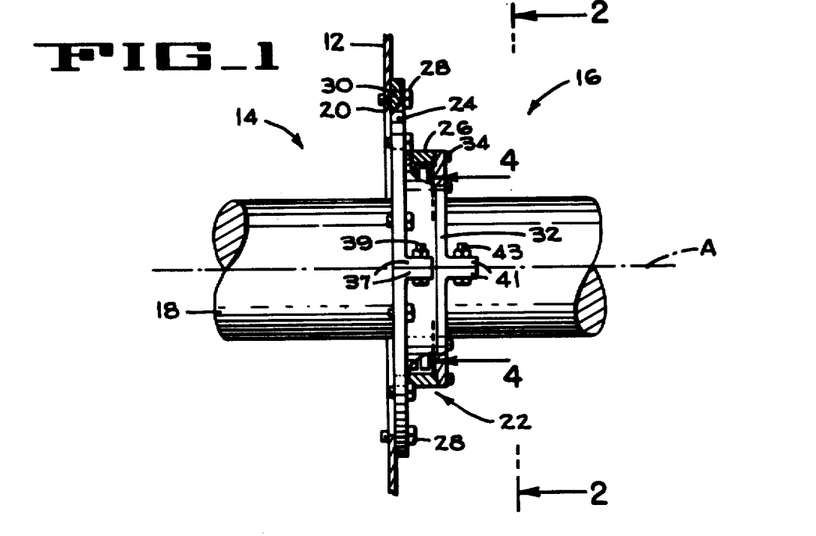
FIG. 1 is a side view, partly in cross-section, showing the sealing apparatus of the present invention mounted in a bulkhead of a ship.
Figures 2, 4:
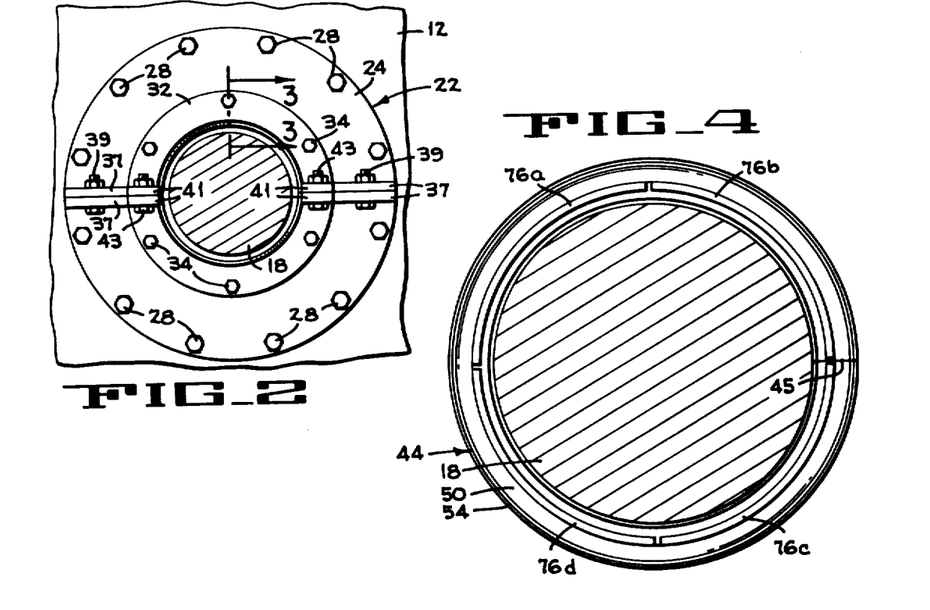
FIG. 2 is a view taken on the line 2—2 of FIG. 1.
FIG. 4 is a view taken on the line 4—4 of FIG. 1.
Figure 10:
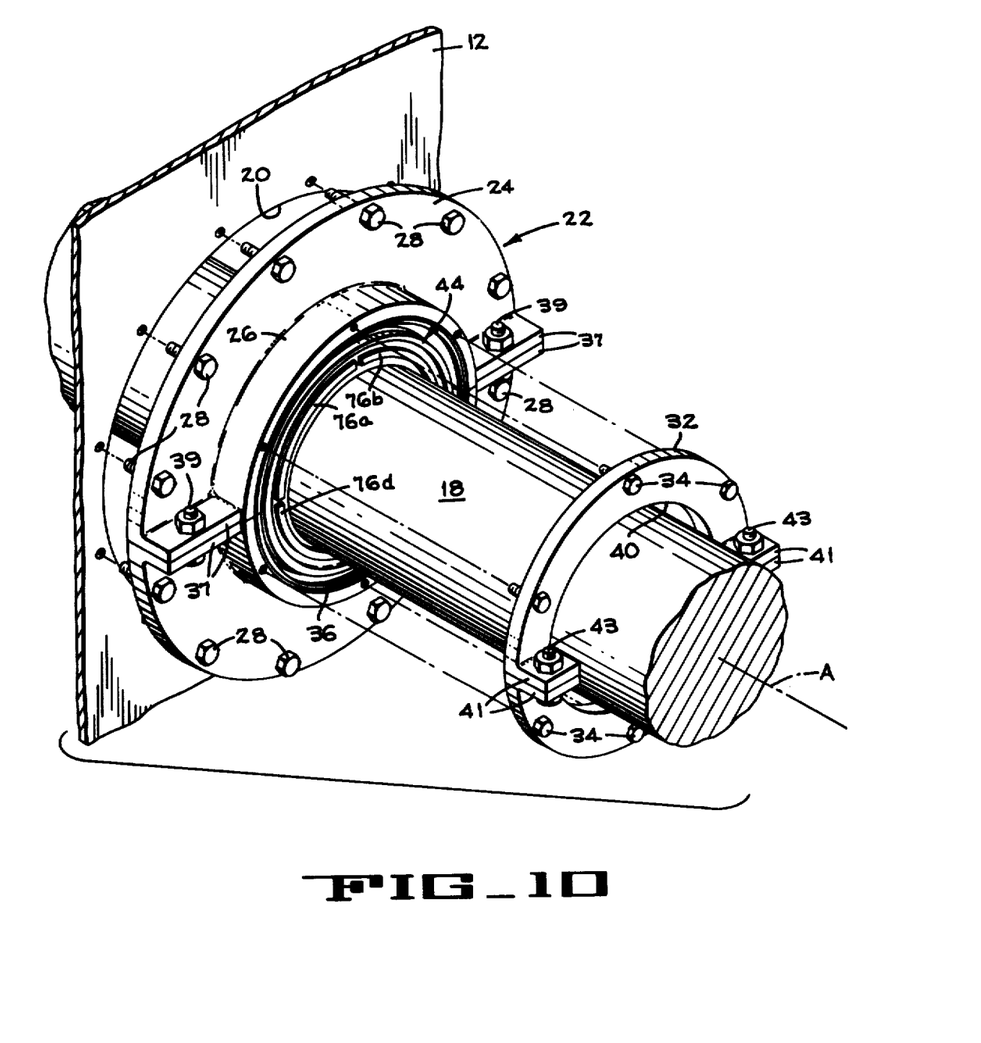
FIG. 10 is an exploded, perspective view of the sealing apparatus of FIG. 1.

There is shown in FIGS. 1, 2 and 10 the bulkhead 12 of a ship having compartments or zones 14 and 16 separated by the bulkhead. A rotating shaft 18 of the ship's machinery extends between the two compartments and passes through an opening 20 in the bulkhead.

In the normal course of the ship's operation, there is no need to seal the opening 20 in the bulkhead around the shaft because neither compartment contains a liquid, or other substance, which must be blocked from the adjacent compartment. However, in the event of damage to the ship so that one of the compartments, 14 or 16, becomes flooded, it is desirable to seal the opening 20 in the bulkhead around the shaft to prevent the escape of water from the flooded compartment to the adjacent compartment.

To this end, a housing 22 is secured to the bulkhead 12 over opening 20. The housing has a circular base 24 and a central circular wall 26 extending outwardly therefrom. The outer edge of the base 24 is bolted to the bulkhead 12 by bolts 28, and an O-ring 30, mounted in a groove in the base, is pressed into sealing engagement with the bulkhead when the bolts 28 are drawn up tight. The wall 26 has a cover 32 bolted thereto, by bolts 34, with an O-ring 36, mounted in a groove in the wall, between the cover and the wall to seal the joint against seepage of water. The base 24 and cover 32 have central openings 38 and 40, respectively, through which the rotating shaft 18 passes, defining gaps G14 and G16, respectively. To facilitate installation, the housing 22 and cover 32 are split at a central bisecting plane, as shown in FIGS. 2 and 10. Each half of the housing has protruding pads 37 at that plane, on opposite sides of opening 38, to receive securing bolts 39. Each half of the cover 32 has protruding pads 41 at that plane, on opposite sides of opening 40, to receive securing bolts 43. The housing and cover, when the halves thereof are secured together, define an internal annular chamber 42 around the shaft 18.

In the preferred form of the invention (see FIG. 3A), a sealing member 44 is secured to the shaft 18 for rotation in the chamber 42 as the shaft rotates. The sealing member 44 has a hub portion 46 with radially outwardly extending, spaced apart, circular flanges 48 and 50. The hub portion 46 has a central bore 52 through which the shaft 18 passes, the outer portions of the bore being tapered (as at 53) to accommodate deflection of the shaft, which might occur in the event of an accident, without a corresponding cocking of the sealing member 44 in the housing chamber 42. The hub and flanges constitute an annular ring which is split, as at 45 (FIG. 4), to facilitate installation. The hub portion 46 has end surfaces 46a, 46b, respectively, normal to the central axis A of the shaft. The two flanges 48 and 50, which extend generally radially outward in spaced relation to each other, are slightly inclined away from a center plane B (which extends through the sealing member 44 normal to axis A of the shaft) as the flanges extend outwardly. The flanges, at their outer ends, terminate in sealing surfaces 52, 54, which are radially beyond the boundary, or periphery, of openings 38, 40. The sealing member 44 is made of a flexible, resilient material, such as rubber.

We have heretofore employed a sealing member secured to a rotating shaft, which sealing member is received in a housing for rotation therein to seal the opening between the shaft and a bulkhead. However, in this previous sealing apparatus, we had the outwardly extending flanges continuously pressed into sealing engagement with the walls of the housing in which the sealing member rotated. The continuous rubbing engagement of the flanges with the walls of the housing required frequent inspections to assure that the sealing member flanges had not worn to the point where they could not effectively seal against the seepage of water in the event one of the compartments became flooded. Replacement of the sealing member because of wear was also required on occasion, even though no flooding had yet occurred. In other words, the sealing member would become too worn for effective use, even though it had not yet been called upon to do the sealing job for which it was designed.

In the present invention, in order to overcome excessive wear of the sealing member before an actual sealing is required, we have provided flanges 48, 50 (FIGS. 3A or 3B) which are normally spaced from the parallel end, or wall, surfaces (designated as 56, 58, respectively) of chamber 42 (FIGS. 3A or 3B) to define a gap or gaps 60, 62 therebetween. We have thus provided, in the present invention, a sealing member which rotates with the shaft (as our previous sealing member) but which (unlike our previous sealing member) makes no rubbing contact with the housing (or with any other member).

Figure 3A:
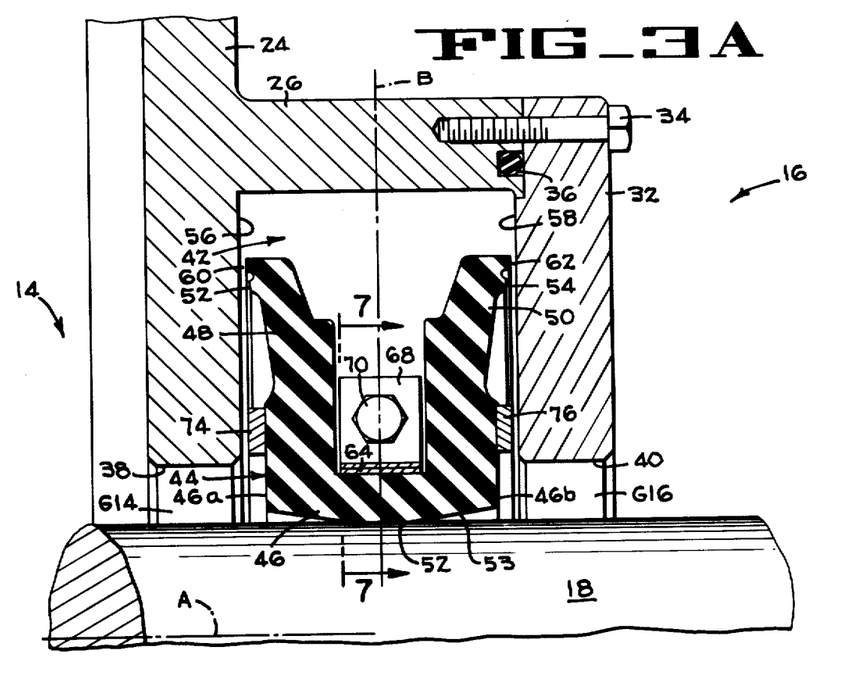
FIG. 3A is an enlarged view, taken on the line 3—3 of FIG. 2.
Figure 7:
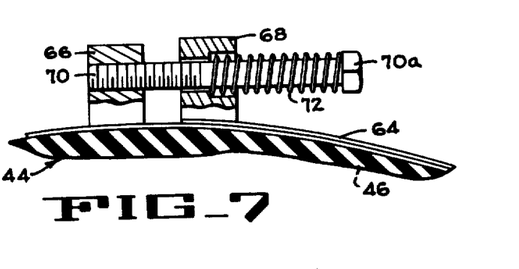
FIG. 7 is a view taken on the line 7—7 of FIG. 3A.

As shown in FIG. 3A, the sealing member 44 is secured tightly to the shaft 18 for rotation therewith by means of a band 64 which is received between the spaced apart flanges 48, 50 and completely encircles the hub 46 of the sealing member. As shown best in FIG. 7, blocks 66, 68 are secured, respectively, at one end of the band and close to the other end of the band. A screw 70, extending through block 68, is threadedly received in block 66. A spring 72 is received on the screw 70 between block 68 and the head 70a of the screw to draw the band up tight on the hub 46 of the sealing member when the screw 70 is drawn up tight. The sealing member, which is made of a flexible resilient material such as rubber, is squeezed down on the shaft by the band to grip the shaft tightly for rotation with the shaft. The band holds the sealing member tightly enough on the shaft to prevent the seepage of water (if one of the compartments 14 or 16 becomes flooded) along the shaft and under the sealing member.

Although not necessary to the effective operation of the invention, we, preferably, provide thrust shoulders, indicated generally at 74 and 76, secured to the sides of the sealing member hub 46. The thrust shoulders, which are ring shaped members secured, respectively, to the ends 46a, 46b of sealing member 44, are each composed of four segments (such as the four segments 76a, 76b, 76c and 76d) shown in FIG. 4. These segments are made of carbon, or a hard plastic such as Teflon, to provide a bearing surface in the event that the bulkhead, or the shaft, is shifted in an axial direction because of some abnormal condition. Normally, the sealing member 44 is centered in the housing chamber 42 (as viewed in FIG. 3A) so that the thrust shoulders 74 and 76 are spaced from the inner walls 56, 58 of the chamber 42.

Figure 3B:
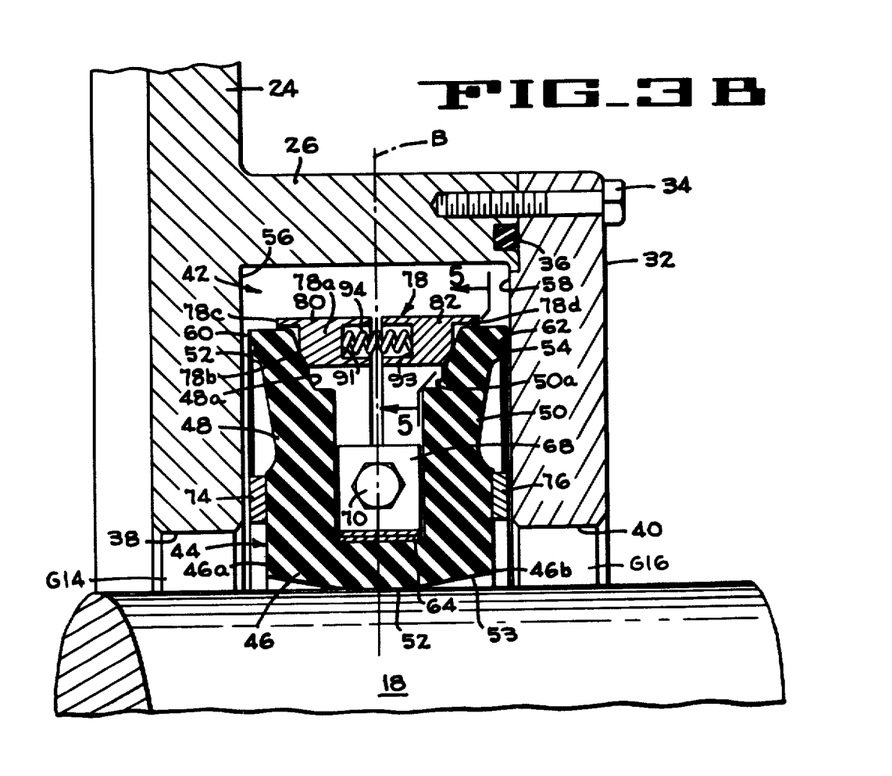
FIG. 3B is a view similar to FIG. 3A, but showing a different embodiment of the invention.
Figure 5:
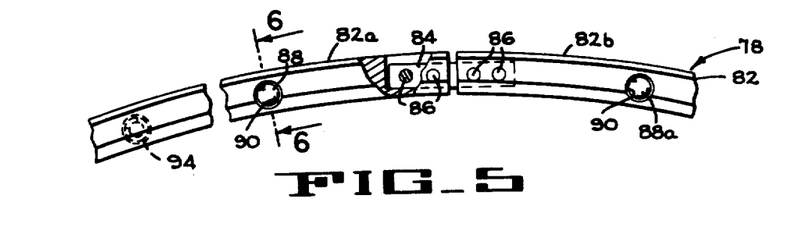
FIG. 5 is a view taken on the line 5—5 of FIG. 3B.
Figure 6:
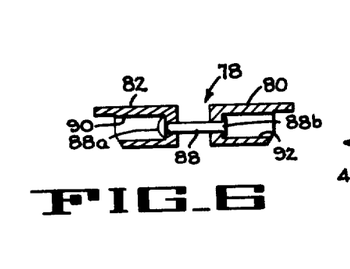
FIG. 6 is a view taken on the line 6—6 of FIG. 5.

Although not normally necessary, a stabilizing ring member 78 may be provided, as shown in FIG. 3B, to prevent buckling of the flanges and to provide a force transfer between the flanges. The ring member 78 is made up of two segments 80 and 82, each of which comprises two half-rings (such as 82a, 82b of FIG. 5) held together by links 84 which are pinned, as at 86, to the two half-rings. The two ring segments 80 and 82 are held together by retaining rivets 88 (FIG. 6), having a head 88a at one end received in a bore 90 in segment 82, and having a shank 88b received in a bore 92 in segment 80. The bores 90 and 92 are restricted at their inner ends to hold the heads 88a and the peened ends of shanks 88b so that the segments, after the retaining pins 88 have been installed, cannot be separated beyond the limits defined by the space between the heads and peened ends of the retaining rivets. The segments are normally held in their extreme spaced apart positions by compression springs 94 (FIG. 3B) which are received in bores 91 and 93 of the members 80 and 92, respectively.

As shown in FIG. 3B, the stabilizing member 78 has a body 78a with a frusto-conical portion 78b, and has flanges 78c and 78d extending from the sides of the body at its outer surface. When the stabilizing ring member is installed, as shown in FIG. 3B, it seats between the outer ends of flanges 48, 50 of the sealing member, with the sides of the body 78a engaged in complementary relation to the inclined inner surfaces 48a and 50a of the flanges. The stabilizing member, in its normal position between the flanges of the sealing member, does not urge the flanges into engagement with the inner walls 56, 58 of chamber 42. Thus, the gaps 60, 62 between surfaces 52, 54 of the flanges and the walls 56, 58 are preserved even with the stabilizing member in place. The stabilizing member, however, does serve to prevent the flanges from buckling inward beyond a limited amount as will be more fully explained hereafter.

Members similar to the band 64, the thrust shoulder 74, 76, and the stabilizing member 78 have been used before by us in our earlier seal. However, in our earlier seal, the stabilizing member served to urge the sealing member flanges into continuous rubbing engagement with the walls of the housing.

In normal operation of the ship, the compartments 14 and 16 are not under water, and no sealing between the compartments is required. The sealing member 44 is rotating (in chamber 42) with the shaft 18, but no part of the sealing member is engaged with any part of the stationary housing, or any other stationary member. Consequently, no part of the resilient rubber sealing member will undergo wear, and frequent inspection and/or replacement of the seal is not necessary.

Figure 8A:
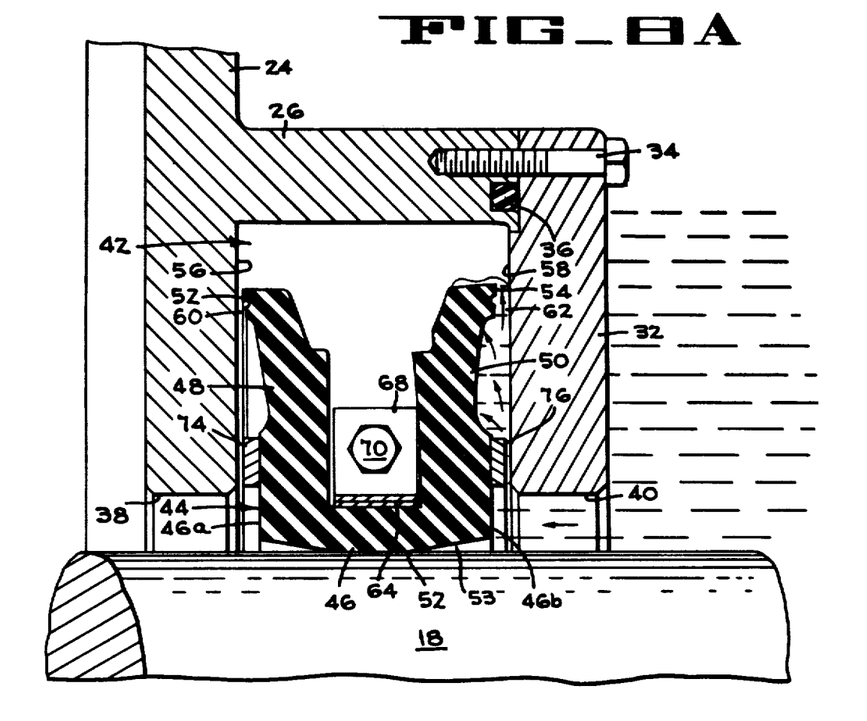
FIG. 8A is a view similar to FIG. 3A (and showing the same embodiment of the invention) but showing the conformation of the sealing member as water from a flooded compartment initially rushes into the housing.
Figure 8B:
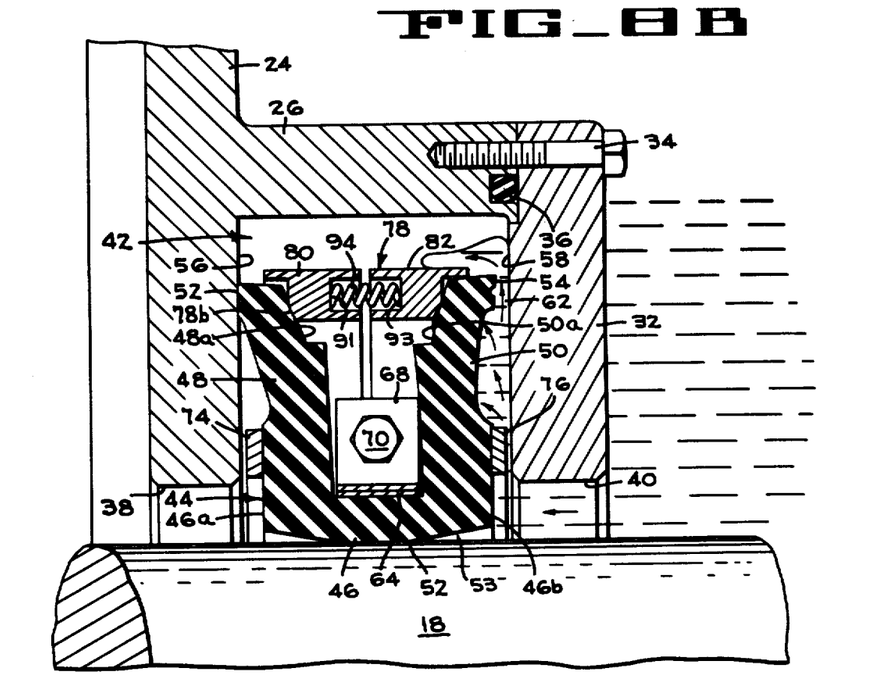
FIG. 8B is a view similar to FIG. 3B (and showing the same embodiment of the invention) but showing the conformation of the sealing member as water from a flooded compartment initially rushes into the housing.
Figure 9A:
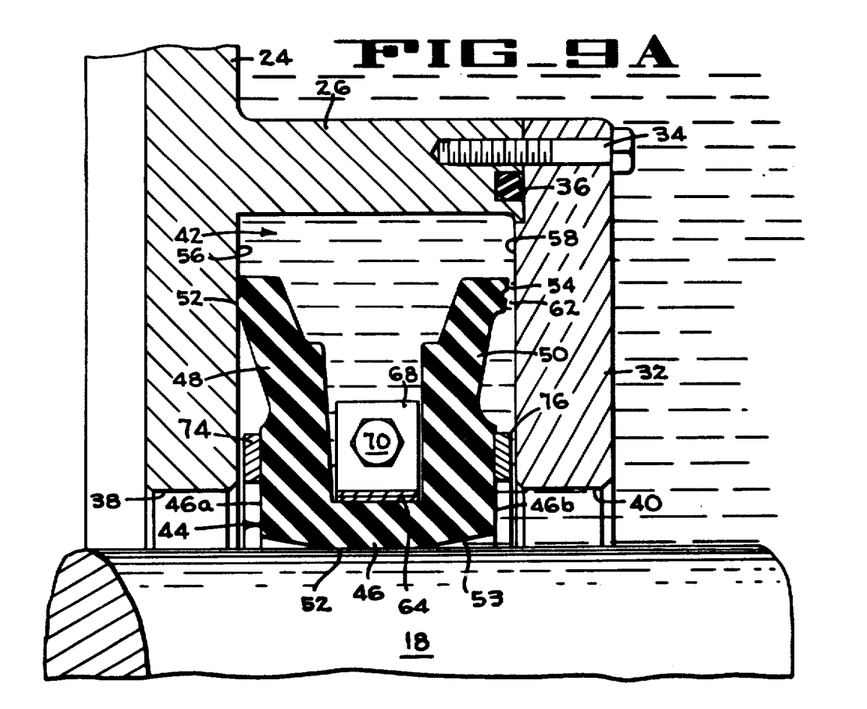
FIG. 9A is a view similar to FIG. 8A (and showing the same embodiment of the invention) but showing the conformation of the sealing member after the water has filled the portion of the housing in communication with the flooded compartment.
Figure 9B:
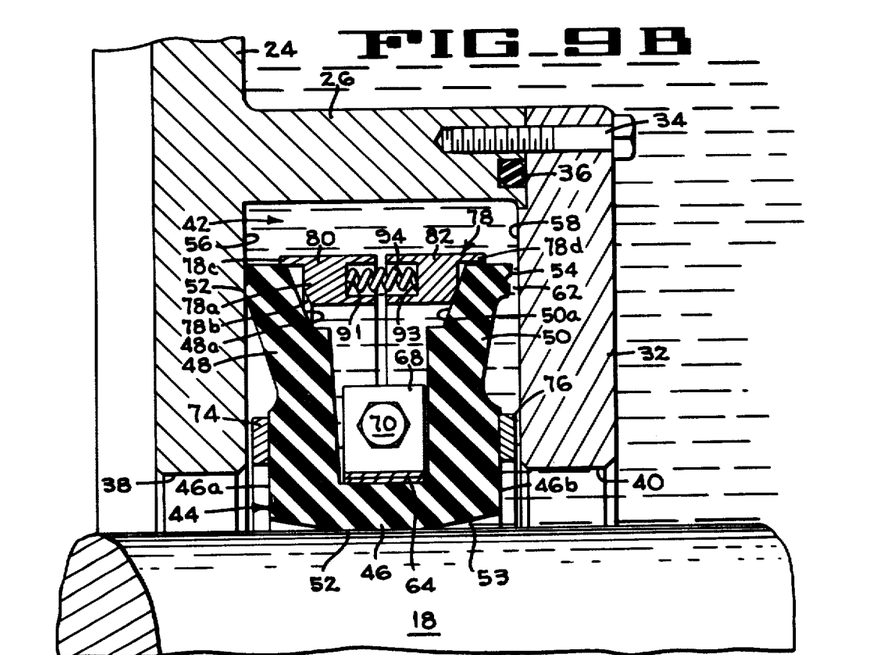
FIG. 9B is a view similar to FIG. 8B (and showing the same embodiment of the invention) but showing the conformation of the sealing member after the water has filled the portion of the housing in communication with the flooded compartment.

In the event that one compartment, say compartment 16, becomes flooded, the seal will act, in response to the pressure of the water in compartment 16 (which exceeds the pressure in chamber 42), to automatically effect a water-tight seal between the two compartments. The water in compartment 16, which cannot pass between the sealing member 44 and the shaft 18, will enter gap G16 and rise between the flange 50 and wall 58, and pass through the circular gap 62 into chamber 42, as shown in FIG. 8A. The flow of water into chamber 42 will initially deflect the flange 50 inwardly (that is, to the left, as shown in FIG. 8A) to widen gap 62 and quickly fill chamber 42. The water enters chamber 42 past flange 50 (through gap 62 which is now expanded) faster than it can escape past flange 48 (through gap 60) so the pressure in chamber 42 rises quickly. The rising pressure in chamber 42 urges flange 48 (which may still be rotating) into sealing engagement with wall 56 (FIG. 9A), thereby closing gap 52 and blocking flow through gap G14. When the pressure in chamber 42 matches the pressure in compartment 16, the flange 50 returns to its normal position (FIG. 3A). A similar operation occurs, except in the reverse manner, if the flooding occurs in compartment 14 instead of compartment 16. If the stabilizing member 78 is used, as shown in FIG. 8B, the force exerted on flange 50 will be transmitted through the stabilizing member 78 to the flange 48, which is then also deflected to the left to press the rotating sealing surface 52 into sealing relation with stationary wall 56. After the water has filled chamber 42, the force of the pressure bearing against the inner surface 48a of the flange 48 will retain the sealing surface 52 of the flange against wall 56, as shown in FIG. 9B. At that time, however, the pressure on opposite sides of flange 50 has equalized, so flange 50 returns to its initial, normal position. Without the stabilizing member 78, the flange 50 might buckle inwardly under the force of the inrushing water and the sealing surface 52 of flange 48 would not be initially pressed against surface 56 until the pressure had built up in chamber 42.

It should be noted that if the flange 50 were eliminated, the flange 48 would still be deflected from its normal position to its sealing position, by the pressure of the fluid in compartment 16, but probably only after a significant quantity of water had escaped through gap 60 into compartment 14. The use of two flanges 48, 50, and a bridging ring 78, assures a quicker closing of gap 60 since the flange 50, and hence (by virtue of ring 78) the flange 48, will be deflected by the initial flow of water rushing into the chamber 42. Moreover, the use of two flanges 48 and 50 insures a sealing action regardless of whether compartment 16 or 14 is flooded. The use of a single flange, such as only flange 48, will seal if the flooding water enters compartment 16, but will not seal if the flooding water enters compartment 14. This is because in the former case, the flange is deflected into sealing engagement with wall 56, while in the latter case, the flange is deflected away from wall 56.

Thus, it will be seen that the sealing member 44 suffers no wear under normal conditions of operation of the ship, even though the ship is in operation for years, because there is normally no rubbing engagement between the flexible resilient sealing member (which is made of rubber or other soft material) and the stationary housing. However, when one compartment becomes flooded, a portion of the seal is pressed into rubbing engagement with a stationary member to form a seal between the flooded compartment and the adjacent compartment.

Although the best mode contemplated for carrying out the present invention has been herein shown and described, it will be apparent that modification and variation may be made without departing from what is regarded to be the subject matter of the invention.

What is claimed is:

1. In a structure having a partition separating two normally dry compartments and having a rotatable shaft extending from one compartment to the other through the partition, apparatus for preventing fluid which floods one compartment from entering the other compartment and alternatively for preventing fluid which floods said other compartment from entering said one compartment, said apparatus having a chamber in said partition defined in part by spaced apart walls, said chamber closed except for openings in said walls to receive with clearance said rotatable shaft, said apparatus including a pair of spaced flanges on said rotatable shaft extending radially outwardly therefrom between said walls, said flanges, respectively, positioned adjacent said walls and extending radially outward beyond the boundaries of said openings, the improvement wherein each of said flanges is normally spaced from the adjacent wall but wherein each of said flanges is flexible under the force of fluid under pressure entering said chamber for sealing engagement of one of said flanges with the wall adjacent thereto.

2. Apparatus for blocking flow from one compartment to another, said compartments having a rotatable shaft extending therebetween, said apparatus comprising means to separate said compartments including a pair of spaced wall sections between said compartments, said wall sections having aligned openings to receive with clearance said rotatable shaft, means connecting said wall sections radially outwardly from said openings to define a chamber totally enclosed except for said aligned openings, a seal made of resilient material having a hub portion secured to said shaft and having a pair of spaced flanges extending radially outwardly beyond the boundaries of said openings in closely spaced relation to said wall sections, one of said flanges deflectable into sealing engagement with one of said walls in response to a higher pressure in said chamber from fluid from the compartment on the other side of the other wall and the other of said flanges deflectable into sealing engagement with said other of said walls in response to higher pressure in said chamber from fluid from the compartment on the other side of said one wall.

3. Apparatus for blocking the flow of fluid from one compartment to an adjacent compartment and alternatively from said adjacent compartment to said one compartment through a partition having a rotatable shaft extending therethrough, the apparatus comprising a housing in said partition having a pair of spaced wall sections, said wall sections having aligned openings on an axis to receive with clearance said shaft as it extends from said one compartment to said adjacent compartment, said housing defining in said partition an internal totally enclosed chamber except for said openings and said housing defining with said partition a fluid tight barrier between said compartments except for said openings, a resilient seal having a hub portion and a pair of spaced flanges, a band around said hub portion and between said flanges to clamp the hub portion securely to the shaft, said flanges extending radially outwardly from said hub portion beyond the boundaries of said openings in closely spaced relation to said wall sections, one of said flanges pressed into sealing contact with the wall section adjacent thereto on the increase of fluid pressure within said chamber above the pressure in the compartment on the other side of the wall from said one flange to block the flow of fluid between said compartments and, alternatively, the other of said flanges pressed into sealing contact with the wall section adjacent thereto on the increase of fluid pressure within said chamber above the pressure in the compartment on the other side of the wall from said other of said flanges to block the flow of fluid between said compartments.

4. Apparatus for blocking flow through a dividing partition having a rotatable shaft extending therethrough from one compartment on one side of said partition to another compartment on the other side of the partition, the combination comprising a housing in said partition including a pair of spaced walls to define a fluid tight chamber except for aligned openings in said walls to pass said rotatable shaft through said chamber with clearance, a seal member mounted on said shaft for rotation therewith in said chamber, said seal member having spaced apart annular flanges adjacent said walls, respectively, and extending radially beyond the boundaries of said openings, the improvement wherein each of said flanges is normally spaced from a wall of said chamber to define a gap therebetween, water under pressure from either of said compartments received through the gap nearest said compartment deflecting the flange at the other gap to press said flange into sealing relation with the chamber wall adjacent thereto.

5. Apparatus for sealing a partition opening through which a rotating member passes comprising means including spaced apart surfaces defining an annular chamber around said rotating member in the partition, a seal secured to the rotating member and having spaced apart radial flanges in said chamber adjacent to and in spaced relation with said surfaces thereof respectively, one of said flanges flexible away from the surface adjacent thereto to admit liquid flow into the chamber in response to a higher pressure on one side of said partition than in said chamber, and the other of said flanges flexible toward the surface adjacent thereto and into sealing contact therewith in response to a higher liquid pressure in the chamber than on the other side of said partition, said one flange flexible toward the surface adjacent thereto to block liquid flow from the chamber in response to a lower pressure on said one side of said partition than in said chamber, and the other of said flanges flexible away from the surface adjacent thereto to admit liquid flow into the chamber in response to a lower pressure in said chamber than on said other side of said partition.

6. Apparatus for blocking flow through a dividing partition having a rotatable shaft extending from one compartment on one side of said partition to another compartment on the other side of said partition, the combination comprising means including spaced apart walls to define in said partition a chamber closed except for openings in said walls to receive with clearance said rotatable shaft, said apparatus having a pair of spaced sealing flanges secured to said shaft and extending radially outwardly therefrom between said walls, the improvement wherein each of said flanges is normally spaced from the wall adjacent thereto but wherein either flange when the nearest compartment is flooded is deflected away from the wall adjacent thereto to permit a rapid filling of the chamber and the flange farthest from the flooded compartment is deflected into the wall adjacent thereto to block the escape of fluid from the chamber.

7. Apparatus for blocking flow through a dividing partition, said partition having a rotatable shaft extending therethrough from one compartment on one side of said partition to another compartment on the other side of said partition, said partition having an opening to receive with clearance said shaft and having surfaces perpendicular to said shaft, said apparatus including a pair of spaced flexible sealing flanges secured to said shaft and extending radially outwardly therefrom, the improvement wherein each of said flanges is normally spaced from one of said surfaces, respectively, one of said flanges deflectable in one direction into sealing engagement with one of said surfaces under the force of fluid pressure in one of said compartments and the other of said flanges deflectable in the opposite direction into sealing engagement with the other of said surfaces under the force of fluid pressure in the other of said compartments.

* * * * *